(12) United States Patent
Qiu et al.

(10) Patent No.: US 11,714,864 B2
(45) Date of Patent: Aug. 1, 2023

(54) METHOD AND APPARATUS FOR PROCESSING WEB CONTENT, DEVICE, AND COMPUTER STORAGE MEDIUM

(71) Applicant: TENCENT TECHNOLOGY (SHENZHEN) COMPANY LIMITED, Guangdong (CN)

(72) Inventors: Zhi Jie Qiu, Shenzhen (CN); Jun Rao, Shenzhen (CN); Yi Liu, Shenzhen (CN); Bo Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 151 days.

(21) Appl. No.: 17/359,874

(22) Filed: Jun. 28, 2021

(65) Prior Publication Data

US 2021/0326400 A1 Oct. 21, 2021

Related U.S. Application Data

(63) Continuation of application No. PCT/CN2020/092575, filed on May 27, 2020.

(30) Foreign Application Priority Data

May 28, 2019 (CN) .......................... 201910451826.2

(51) Int. Cl.
*G06F 16/00* (2019.01)
*G06F 16/9535* (2019.01)

(52) U.S. Cl.
CPC ................. *G06F 16/9535* (2019.01)

(58) Field of Classification Search
CPC .. G06F 16/90335; G06F 16/00; G06F 16/285; G06F 16/9577; G06F 2203/04803;
(Continued)

(56) References Cited

U.S. PATENT DOCUMENTS

| 2010/0205541 A1* | 8/2010 | Rapaport | G06Q 10/10 715/753 |
| 2017/0140051 A1* | 5/2017 | Ball | G06F 16/358 |
| 2019/0377830 A1* | 12/2019 | Weldemariam | G06F 40/106 |

FOREIGN PATENT DOCUMENTS

| CN | 104572734 A | 4/2015 |
| CN | 109087130 A | 12/2018 |

(Continued)

OTHER PUBLICATIONS

Shuai Zhang, et al., "Next Item Recommendation with Self-Attention", Proceeding of Conference Submission, Aug. 25, 2018, 10 pages.

(Continued)

*Primary Examiner* — Shyue Jiunn Hwa
(74) *Attorney, Agent, or Firm* — Sughrue Mion, PLLC

(57) ABSTRACT

A method and an apparatus for processing web content, a device, and a computer storage medium are provided. A long-term feature group and a short-term feature group are determined from historical browsing data of a user according to generation time points of elements in the historical browsing data. A long-term encoding vector corresponding to the long-term feature group is determined according to similarities between elements in the long-term feature group, a user embedding vector corresponding to the short-term feature group is determined according to the long-term encoding vector and similarities between elements in the short-term feature group, and at least one web content is determined as a recommendation candidate and provided to the user.

16 Claims, 11 Drawing Sheets

(58) Field of Classification Search
CPC ........ G06F 40/106; G06F 9/451; G06F 9/453; G06F 16/176; G06F 16/23; G06F 16/2455; G06F 16/3328; G06F 16/3334; G06F 16/3338; G06F 16/358; G06F 16/9027; G06F 16/90332; G06F 16/9038; G06F 16/93; G06F 16/9535; G06F 16/9558; G06F 17/18; G06F 2203/011; G06F 3/005; G06F 3/0481; G06F 3/04817; G06F 3/0482; G06F 40/242; G06F 40/247; G06F 40/30; G06F 40/40; G06F 16/951; G06F 16/954; G06F 16/957; G06F 16/9562; G06F 16/958; G06F 17/00; G06F 3/0483; G06F 16/353; G06F 16/367; G06F 40/143; G06F 16/3347; G06F 16/955
See application file for complete search history.

(56) References Cited

FOREIGN PATENT DOCUMENTS

| | | |
|---|---|---|
| CN | 109492157 A | 3/2019 |
| CN | 110245293 A | 9/2019 |

OTHER PUBLICATIONS

Lei Li, et al., "Modeling and broadening temporal user interest in personalized news recommendation", Expert Systems with Applications, Jun. 30, 2014, pp. 3168-3177, vol. 41.

International Search Report for PCT/CN2020/092575 dated Aug. 27, 2020 (PCT/ISA/210).

Written Opinion for PCT/CN2020/092575 dated Aug. 27, 2020 (PCT/ISA/237).

* cited by examiner

| Long-term feature group | Tag 1, Tag 2, Tag 3 |
| | Category 1, Category 2, Category 3 |
| | Tag 1', Tag 2', Tag 3' |
| | Category 1', Category 2', Category 3' |
| | Male, 34 years old, Beijing |
| Short-term feature group | Tag 1", Tag 2", Tag 3" |
| | Category 1", Category 2", Category 3" |
| | Document ID 1, Document ID 2, Document ID 3 |

| | |
|---|---|
| Long-term tag feature group | Tag 1, Tag 2, Tag 3 |
| Long-term category feature group | Category 1, Category 2, Category 3 |
| Past-seven-day tag feature group | Tag 1', Tag 2', Tag 3' |
| Past-seven-day category feature group | Category 1', Category 2', Category 3' |
| User basic attribute information | Male, 34 years old, Beijing |

| Short-term tag feature group | Tag 1", Tag 2", Tag 3" |
|---|---|
| Short-term category feature group | Category 1", Category 2", Category 3" |
| Short-term document ID feature group | Document ID 1, Document ID 2, Document ID 3 |

FIG. 6

| | |
|---|---|
| Long-term tag feature group | Tag 1, Tag 2, Tag 3 |
| Long-term category feature group | Category 1, Category 2, Category 3 |
| Past-seven-day tag feature group | Tag 1', Tag 2', Tag 3' |
| Past-seven-day category feature group | Category 1', Category 2', Category 3' |
| User basic attribute information | Male, 34 years old, Beijing |
| Short-term tag feature group | Tag 1", Tag 2", Tag 3" |
| Short-term category feature group | Category 1", Category 2", Category 3" |
| Short-term document ID feature group | Document ID 1, Document ID 2, Document ID 3 |

FIG. 9

METHOD AND APPARATUS FOR PROCESSING WEB CONTENT, DEVICE, AND COMPUTER STORAGE MEDIUM

CROSS-REFERENCE TO RELATED APPLICATION(S)

This application is a bypass continuation application of International Application No. PCT/CN2020/092575, filed on May 27, 2020, which claims priority to Chinese Patent Application No. 201910451826.2 filed on May 28, 2019 with the China National Intellectual Property Administration, the disclosures of which are herein incorporated by reference in their entireties.

FIELD

The disclosure relates to the field of data processing, and in particular, to a method and an apparatus for processing web content, a device, and a computer storage medium.

BACKGROUND

Users can browse various web content via smart terminals. For example, users may read, play, and view web content. The smart terminal or an application on the smart terminal can recommend web content for the user in the browsing process, which may be of interest to the user, so as to improve browsing experience of the user.

In the related art, a personalized recommendation method extracts tags from articles read by a user (or videos watched by the user) in history, and use the tags to match recommendation candidates, or determine an item most similar to articles or videos previously read or watched by a user for recommendation.

However, because preferences of the user in a viewing history (such as articles or videos viewed by the user) are not considered, the related art method does not fully satisfy the browsing interests of the user.

SUMMARY

Embodiments of the disclosure provide a method and an apparatus for processing web content, a device, and a computer storage medium, which effectively improve the quality of web content recommended for users.

The following technical solutions are disclosed in the embodiments of the disclosure:

An embodiment of the disclosure provides a method for processing web content, the method including:

determining a long-term feature group and a short-term feature group from historical browsing data of a user according to generation time points of elements in the historical browsing data;

determining a long-term encoding vector corresponding to the long-term feature group according to similarities between elements in the long-term feature group;

determining a user embedding vector corresponding to the short-term feature group according to the long-term encoding vector and similarities between elements in the short-term feature group; and determining, according to the user embedding vector, at least one web content as a recommendation candidate and providing the at least one web content to the user.

An embodiment of the disclosure further provides a method for processing web content, performed a server, the server including one or more processors, a memory, and one or more programs, the one or more programs being stored in the memory, the program including one or more units, each unit corresponding to a set of instructions, the one or more processors being configured to execute the instructions; the method including:

determining a long-term feature group and a short-term feature group from historical browsing data of a user according to generation time points of elements in the historical browsing data;

determining a long-term encoding vector corresponding to the long-term feature group according to similarities between elements in the long-term feature group;

determining a user embedding vector corresponding to the short-term feature group according to the long-term encoding vector and similarities between elements in the short-term feature group; and determining, according to the user embedding vector, at least one web content as a recommendation candidate and providing the at least one web content to the user.

An embodiment of the disclosure provides an apparatus for processing web content, the apparatus including:

at least one memory configured to store program code; and at least one processor configured to read the program code and operate as instructed by the program code, the program code comprising:

first determining code configured to cause at least one of the at least one processor to determine a long-term feature group and a short-term feature group from historical browsing data of a user according to generation time points of elements in the historical browsing data;

second determining code configured to cause at least one of the at least one processor to determine a long-term encoding vector corresponding to the long-term feature group according to similarities between elements in the long-term feature group;

third determining code configured to cause at least one of the at least one processor to determine the user embedding vector corresponding to the short-term feature group according to the long-term encoding vector and the similarities between the elements in the short-term feature group; and fourth determining code configured to cause at least one of the at least one processor to determine, according to the user embedding vector, at least one web content as a recommendation candidate and provide the at least one web content to the user.

An embodiment of the disclosure further provides a server, including a processor and a memory, the memory being configured to store a computer program; and the processor being configured to perform, when running the computer program, the method for processing web content according to the embodiments of the disclosure.

An embodiment of the disclosure further provides a computer storage medium, storing a computer program, the computer program being configured to perform the method for processing web content according to the embodiments of the disclosure.

BRIEF DESCRIPTION OF THE DRAWINGS

To describe the technical solutions in example embodiments of the disclosure or the related art more clearly, the following briefly describes the accompanying drawings for describing the example embodiments. The accompanying drawings in the following description show only some embodiments of the disclosure, and a person of ordinary skill in the art may derive other drawings from the accompanying drawings without creative efforts.

FIG. 6 is a schematic diagram of composition of a short-term feature group according to an embodiment of the disclosure.

FIG. 9 is a schematic diagram of element composition of a persona feature according to an embodiment of the disclosure.

DETAILED DESCRIPTION

The following describes example embodiments of the disclosure with reference to accompanying drawings.

In the related art, personalized recommendation may be made for a user based on historical browsing data of the user; however, in such a personalized recommendation method, preferences of the user in a reading history are not considered. For example, if historical browsing data of a user includes a passive browsing behavior of the user (such as a browsing behavior caused by an accidental operation of the user), browsing data generated based on the passive behavior is also counted as a basis for personalized recommendation for the user. As a result, recommended web content does not fully satisfy the browsing interests of the user.

In view of this problem, an embodiment of the disclosure provides a method for processing web content, including: determining, according to historical browsing data, a user embedding vector that better highlights a browsing preference of a user, and then determining, according to the user embedding vector, web content that is used as recommendation candidates. This method may increase the possibility that recommendation candidates meet actual browsing interests of a user, and improve the quality of web content recommended for the user, thereby improving the browsing experience of the user.

The following describes application scenarios of this embodiment of the disclosure. The method provided in this embodiment of the disclosure is applicable to a data processing device, and the data processing device may be a server. A server 101 may be a dedicated server used only for matching web content, where "match" refers to triggering as many correct results as possible from a full information set, and returning the results for ranking. "Rank" is to rank all matched content, and select results with the highest scores to recommend to the user. This process may be implemented by using the method for processing web content provided in the disclosure. The server 101 may alternatively be a public server that further includes other data processing functions, which is not limited in the embodiments of the disclosure.

For easier understanding of the technical solutions of the disclosure, the method for processing web content provided in this embodiment of the disclosure is introduced below in combination with example application scenarios.

Figure 1:
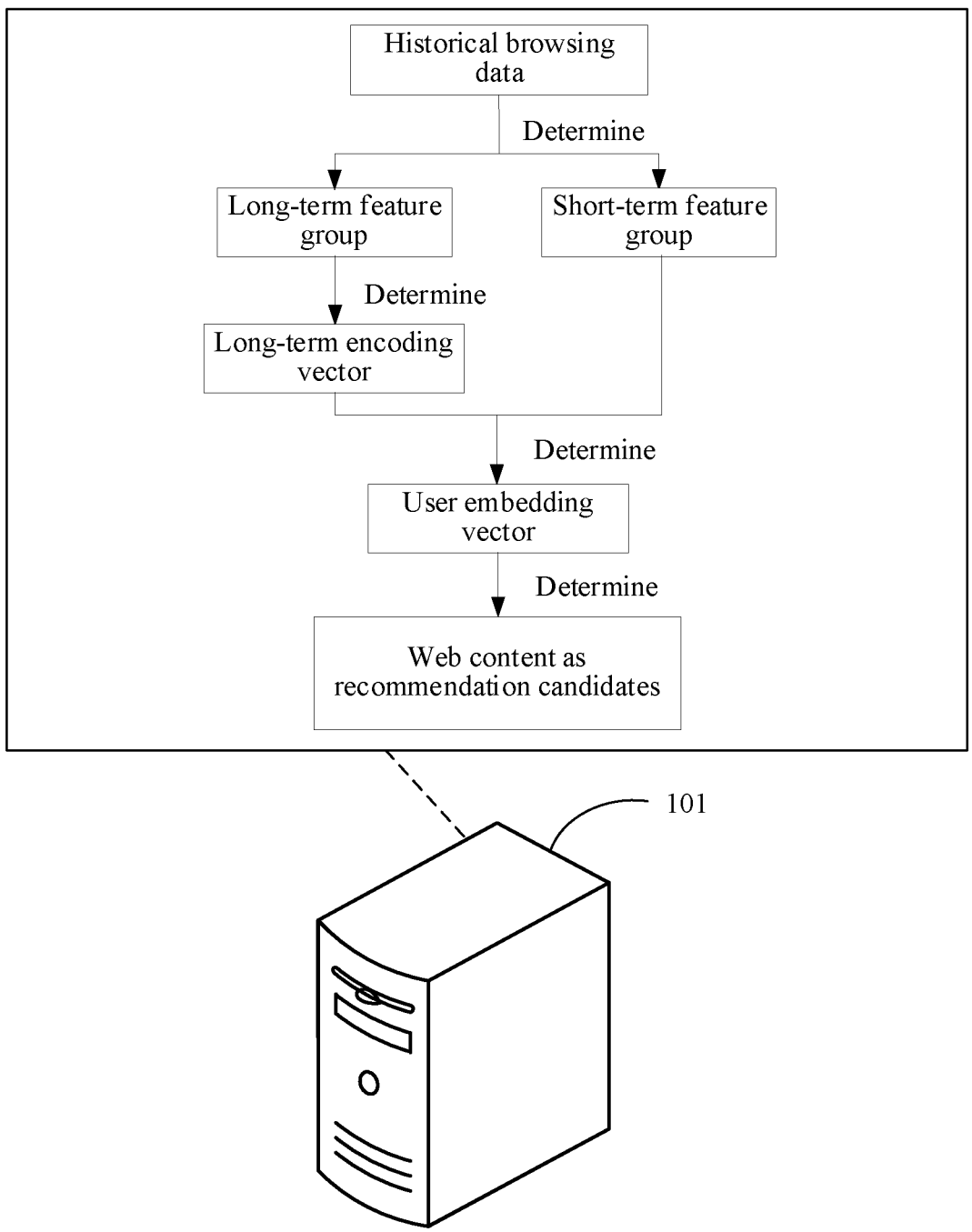
FIG. 1 is a schematic diagram of an application scenario of a method for processing web content according to an embodiment of the disclosure.

FIG. 1 is a schematic diagram of an application scenario of a method for processing web content according to an embodiment of the disclosure. The application scenario includes a server 101, where the server 101 may store historical browsing data of each user. Then, for a certain user, the server 101 may determine a long-term feature group and a short-term feature group according to generation time points of elements in the historical browsing data of the user. The elements may be items related to historical browsing content of the user. For example, the elements may be tags in web content that the user has browsed. The elements in the long-term feature group may be determined based on long-term historical browsing data, and the long-term feature group may reflect long-term browsing interests of the user. The elements in the short-term feature group may be determined based on short-term historical browsing data, and the short-term feature group may reflect short-term browsing interests of the user. For example, if the user has browsed news about sports in the past six months, the word "sports" may be used as an element in the long-term feature group of the user. If the user has browsed news about current affairs in the past day, the term "current affairs" may be used as an element in the short-term feature group of the user.

The user browses more similar web content that fits interest preferences. Therefore, the historical browsing data of the user may include more browsing data that fits the interest preferences of the user. Therefore, the long-term feature group determined based on the historical browsing data of the user includes more elements belonging to similar web content that fits the browsing interests of the user. Since the long-term feature group includes a relatively large number of elements that fit the interest preferences of the user, each element therein has a relatively high similarity with other elements.

In other words, the elements with relatively high similarities in the correspondingly determined long-term feature group are likely similar web content that fits the browsing interests of the user. For example, if the user prefers sports-related web content to current affairs-related web content, the user browses more sports-related web content and less current affairs-related web content. As a result, the determined long-term feature group may include more elements related to sports and fewer elements related to current affairs. For example, the long-term feature group includes 8 sports-related elements and 2 current affairs-related elements. Then, because the number of sports-related elements in the long-term feature group is larger, each sports-related element may have a higher similarity with other elements. It may be learned that elements with higher similarities may better highlight the browsing interest preferences of the user.

Based on this, the long-term encoding vector corresponding to the long-term feature group may be determined according to similarities between the elements in the long-term feature group. Since the long-term encoding vector is obtained according to the similarities between the elements in the long-term feature group, elements with higher similarities may reflect more information in the long-term encoding vector. Therefore, the long-term encoding vector may better reflect degrees of preference of the user for the browsing interests.

The interest preferences of the user may change over time. For example, the user has developed a new interest preference recently. Thus, elements in the short-term feature group may also be taken into consideration. Then a user embedding vector corresponding to the short-term feature group may be determined according to similarities between the long-term encoding vector and the elements in the short-term feature group. Because the user embedding vector is determined based on the similarities between the long-term encoding vector and the elements in the short-term feature group, the determined user embedding vector not only highlights information about long-term browsing interest preferences of the user, but also partly retains other information.

For example, the user has been interested in sports-related web content over a long time, and has barely browsed web content related to online shopping; and the user recently browses more web content related to online shopping in addition to sports-related web content. Correspondingly, the determined short-term feature group may include more elements related to online shopping. If the determined long-term feature group does not include online shopping information of the user, the user embedding vector corresponding to the short-term feature group is determined according to the similarities between the long-term encoding vector and the elements in the short-term feature group. Because the user embedding vector is determined based on the similarities between the long-term encoding vector and the elements in the short-term feature group, the determined user embedding vector still highlights information about long-term browsing interest preferences (related to sports) of the user, and further correspondingly retains information about a new interest (related to online shopping) recently developed by the user.

As a result, the web content determined according to the user embedding vector as the recommendation candidates is more likely to fit actual browsing interests of the user, and is more generalized (or have a certain level of generalization, referring to the generalization ability in machine learning or artificial intelligence (AI) field), thereby improving the quality of web content recommended for the user. The user may easily obtain content of interest through the corresponding process, which improves the browsing experience.

The method for processing web content provided in an embodiment of the disclosure is described below in detail with reference to the accompanying drawings.

Figures 2, 3:
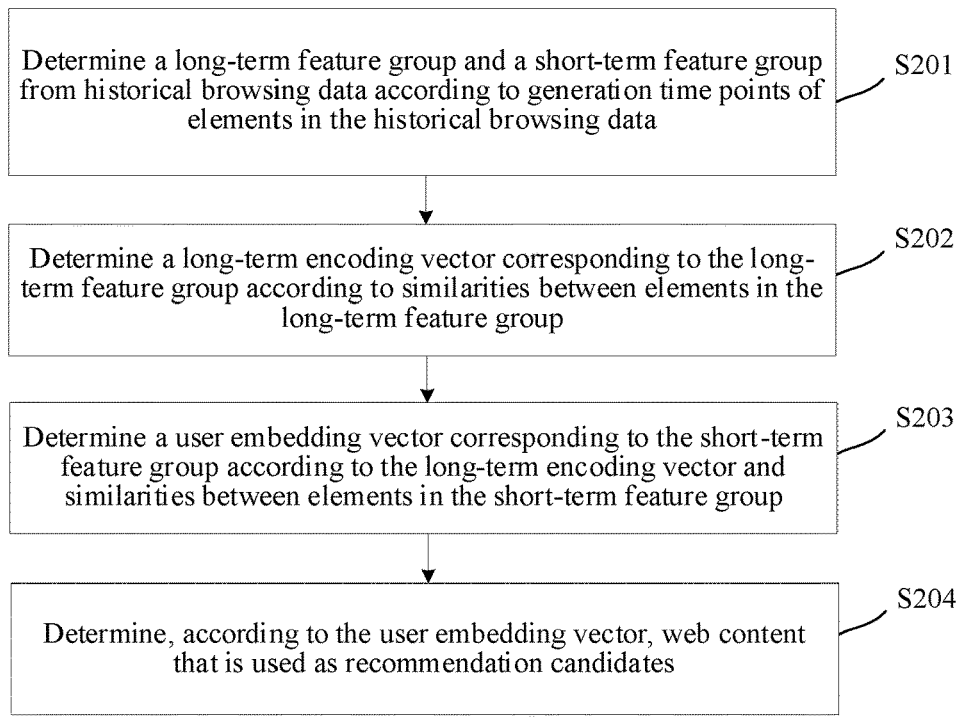
FIG. 2 is a flowchart of a method for processing web content according to an embodiment of the disclosure.
FIG. 3 is a schematic diagram of composition of a long-term feature group and a short-term feature group according to an embodiment of the disclosure.

FIG. 2 is a flowchart of a method for processing web content according to an embodiment of the disclosure. The method includes operations S201-S204.

S201: Determine a long-term feature group and a short-term feature group from historical browsing data according to generation time points of elements in the historical browsing data.

When a user browses web content, a server 101 may generate and save browsing data corresponding to the user accordingly. In this way, the server 101 may store historical browsing data for each of a plurality of different users in a long period of time in the past.

In this embodiment of the disclosure, for a certain user, elements of historical browsing data generated in a long period of time in the past may be determined from historical browsing data based on generation time points of the elements in the historical browsing data of the user, to serve as elements in a long-term feature group, thereby determining the long-term feature group. Elements of historical browsing data generated recently are determined from the historical browsing data based on the generation time points of the elements in the historical browsing data of the user, to serve as elements in a short-term feature group, thereby determining the short-term feature group.

In some embodiments of the disclosure, the short-term feature group of the user may be determined based on, for example, historical browsing data corresponding to documents (or contents) recently read by the user.

Since user basic attribute information may affect browsing interests of the user in a long-term period, the user basic attribute information may be used as an element in the long-term feature group. The user basic attribute information may include, for example, gender, age, and province of the user.

An illustrative example below is used for description. It is assumed that a user U1 has recently clicked to visit an article A1, an article A2, and an article A3. When an article A4 that the user U1 may read next is to be predicted, a long-term feature group and a short-term feature group may be determined from historical browsing data according to generation time points of elements in the historical browsing data.

FIG. 3 is a schematic diagram of composition of a long-term feature group and a short-term feature group according to an embodiment of the disclosure. As shown in FIG. 3, the long-term feature group may be determined based on long-term historical browsing data of the user. The long-term feature group may include: Tag 1, Tag 2, Tag 3, Tag 1', Tag 2', Tag 3', Category 1, Category 2, Category 3, Category 1', Category 2', Category 3', Male (gender), 34 (age), and Beijing (province).

The tags may be, for example, a group of words extracted from web content (such as article titles or body text) browsed by the user in history, and the tags may be used for indicating core content of the web content. The category may be, for example, an abstract description of web content browsed by the user in history. For example, articles introducing sports may belong to the category of sports.

The short-term feature group may be determined according to short-term historical browsing data (the article A1, the article A2, and the article A3) of the user. The short-term feature group may include: Tag 1", Tag 2", Tag 3", Category 1", Category 2", Category 3", document identity (ID) 1, document ID 2, and document ID 3. The document ID may be a number used for identifying a document.

S202: Determine a long-term encoding vector corresponding to the long-term feature group according to similarities between elements in the long-term feature group.

In this embodiment of the disclosure, a long-term encoding vector corresponding to the long-term feature group may be determined according to similarities between the elements in the long-term feature group.

The following is an illustration based on the example corresponding to FIG. 3. It is assumed that in the long-term feature group shown in FIG. 3, elements related to sports account for 80% of the total; elements related to current affairs account for 15% of the total; and elements related to user basic attribute information account for 5% of the total. It may be seen that the user prefers web content related to sports.

Based on this, because elements related to sports account for a higher proportion in the long-term feature group, the elements related to sports have higher similarities with other elements. Therefore, the long-term encoding vector is determined according to the similarities between the elements in the long-term feature group. Since the long-term encoding vector is determined based on the similarities between the elements in the long-term feature group, the long-term encoding vector reflects more information about elements with high similarities (that is, elements related to sports).

S203: Determine a user embedding vector corresponding to the short-term feature group according to the long-term encoding vector and similarities between elements in the short-term feature group.

The interest preferences of the user may change. Therefore, after the long-term encoding vector corresponding to the long-term feature group is determined, a user embedding vector corresponding to the short-term feature group may further be determined according to a similarity between the long-term encoding vector and each element in the short-term feature group.

For example, based on the above described example in S202, it is assumed that the user is interested in shopping recently and has browsed web content of some websites recently. In the determined short-term feature group, for example, elements related to sports account for 70% of the total; elements related to current affairs account for 10% of the total; and elements related to online shopping account for 20% of the total.

Therefore, the user embedding vector corresponding to the short-term feature group may be determined according to similarities between the long-term encoding vector determined in S202 and elements in the short-term feature group. Since the elements related to sports still account for a high proportion in the short-term feature group, and more information related to sports is reflected in the long-term encoding vector, the similarities between the long-term encoding vector and the elements related to sports are high. Therefore, the user embedding vector determined in this way may still highlight information fitting the browsing interest preferences (that is, elements related to sports) of the user.

In addition, because the number of elements related to online shopping contained in the short-term feature group is relatively small, less information related to online shopping is reflected in the long-term encoding vector, and thus the long-term encoding vector has low similarities with the elements related to online shopping. However, because the user embedding vector is determined according to similarities between the long-term encoding vector and elements in the short-term feature group, the determined user embedding vector still retains information related to online shopping.

It may be seen that the determined user embedding vector not only highlights the information that fits the browsing interest preferences of the user, but partly retains other information (such as information about a new interest developed recently by the user).

S204: Determine, according to the user embedding vector, web content that is used as recommendation candidates.

Therefore, web content to be used as recommendation candidates for the user may be determined based on the user embedding vector that fully reflects the browsing interest preferences of the user, so as to improve the quality of web content recommended for the user. By determining, according to the user embedding vector, the web content to be used as the recommendation candidates, the web content may thus be matched. In summary, the long-term feature group and the short-term feature group are determined from the historical browsing data according to the generation time points of the elements in the historical browsing data. In other words, the long-term feature group may reflect long-term browsing interests of the user, and the short-term feature group may reflect short-term browsing interests of the user. The long-term encoding vector corresponding to the long-term feature group is determined according to the similarities between the elements in the long-term feature group. Since the long-term encoding vector is obtained according to the similarities between the elements in the long-term feature group, elements with higher similarities in the long-term feature group reflect more information in the long-term encoding vector. Since the user has more browsing behaviors for similar web content that fits browsing interests, and the determined elements with high similarities are similar web content that fits the browsing interests of the user, the long-term encoding vector may better reflect degrees of preference of the user for the browsing interests. The user embedding vector corresponding to the short-term feature group is determined according to the long-term encoding vector and the similarities between the elements in the short-term feature group, so that in the user embedding vector, information that fits the browsing interest preferences of the user may be relatively prominent, and other information is partly retained. The recommendation candidates determined by the user embedding vector are more likely to fit actual browsing interests of the user, and have a certain level of generalization (referring to the generalization ability in machine learning or AI field), which improves the quality of web content recommended for the user and improves the browsing experience. The recommendation candidates determined in this way are also more customized for the user.

To fully reflect the long-term browsing interest preferences of the user, in an example embodiment, the elements in the long-term feature group may be further classified according to types of the elements, so that the long-term feature group includes a plurality of long-term sub-type feature groups, where each long-term sub-type feature group includes elements of a corresponding type. Description is made below with reference to an illustrative example.

Figures 4, 5:
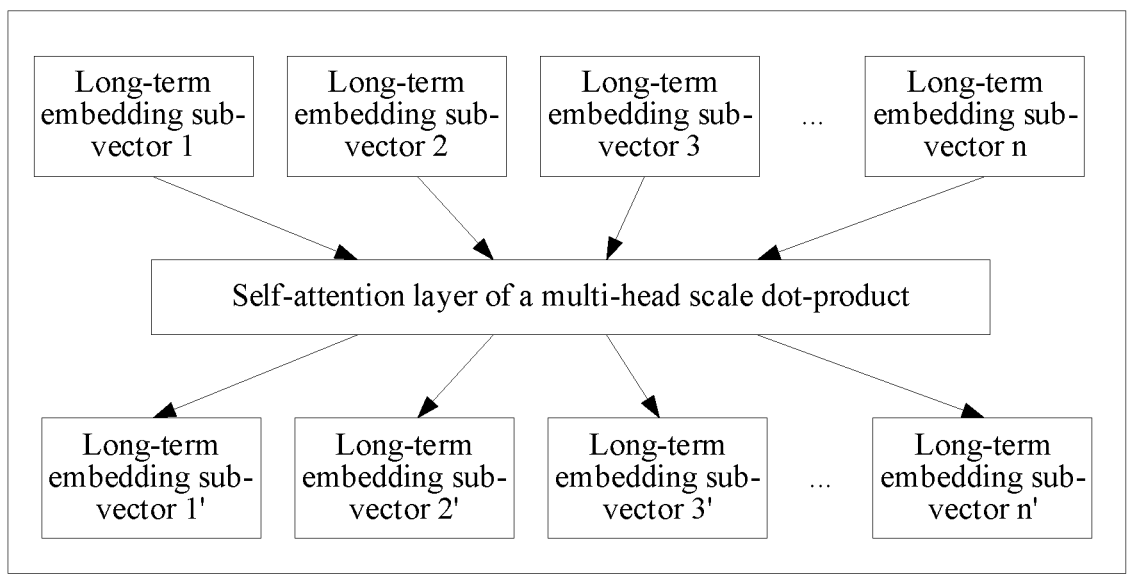
FIG. 4 is a schematic diagram of composition of a long-term feature group according to an embodiment of the disclosure.
FIG. 5 is a schematic diagram of a method for performing calculation of a self-attention network model of a multi-head scale dot-product for long-term embedding sub-vectors according to an embodiment of the disclosure.

FIG. 4 is a schematic diagram of composition of a long-term feature group according to an embodiment of the disclosure. Based on the example in FIG. 3, the elements in the long-term feature group may be classified according to the following five types: tags and categories determined from long-term historical browsing data of a user, tags and categories determined from historical browsing data of a user in past seven days, and user basic attribute information. This is merely an example and the disclosure is not limited thereto.

Therefore, the long-term sub-type feature groups of the long-term feature group after the classification may be as follows: a long-term tag feature group, a long-term category feature group, a past-seven-day tag feature group, a past-seven-day category feature group, and user basic attribute information.

The long-term tag feature group may include tag-type elements, for example, Tag 1, Tag 2, and Tag 3. The long-term category feature group may include category-type elements, for example, Category 1, Category 2, and Category 3. The past-seven-day tag feature group may include tag-type elements, for example, Tag 1', Tag 2', and Tag 3'. The past-seven-day category feature group may include category-type elements, for example, Category 1', Category 2', and Category 3'. The user basic attribute information may include Male (gender), 34 (age), and Beijing (province).

Then the method for determining a long-term encoding vector corresponding to the long-term feature group according to similarities between elements in the long-term feature group in S202 may include the following operations:

S301: Determine a long-term embedding sub-vector corresponding to each long-term sub-type feature group according to similarities between elements in each long-term sub-type feature group.

Correspondingly, elements with high similarities in each long-term sub-type feature group may be similar web content that more fits the browsing interests of the user.

Based on this, for each long-term sub-type feature group in the plurality of long-term sub-type feature groups, a corresponding long-term embedding sub-vector may be determined for each long-term sub-type feature group according to similarities between elements in each long-term sub-type feature group.

In this way, elements with higher similarities in each long-term sub-type feature group reflect more information in the corresponding long-term embedding sub-vector. Therefore, the long-term embedding sub-vector may better reflect degrees of preference of the user for the browsing interests for this type of elements.

For example, it is assumed that Tag 1, Tag 2, and Tag 3 included in the long-term tag feature group are "basketball game", "basketball star", and "football game" respectively. Compared with football, the user prefers web content related to basketball. Then, according to similarities between the three tags, similarities corresponding to basketball are higher. The determined long-term embedding sub-vector corresponding to the sub-type feature group may highlight information related to basketball. That is, the long-term embedding sub-vector highlights information of web content related to basketball preferred by the user.

It may be seen that, for each long-term sub-type feature group included in the long-term feature group, the long-term embedding sub-vector corresponding to each long-term sub-type feature group is determined according to similarities between elements in each long-term sub-type feature group. This allows each long-term embedding sub-vector to highlight information of elements with high similarities in the long-term sub-type feature group. Therefore, the long-term embedding sub-vector may fully reflect the interest preferences of the user for the elements in the corresponding long-term sub-type feature group.

S302: Determine the long-term encoding vector corresponding to the long-term feature group according to similarities between the long-term embedding sub-vectors.

The interest preferences of the user for different long-term sub-type feature groups may be different. For this reason, the long-term encoding vector corresponding to the long-term feature group may also be determined according to the similarities between the long-term embedding sub-vectors.

In this way, the determined long-term encoding vector may highlight the interest preferences of the user for different long-term sub-type feature groups, and the long-term encoding vector may more accurately represent long-term browsing interests of the user.

In the embodiments of the disclosure, the method for determining the similarities between the elements in the long-term feature group in S202, the method for determining the similarities between the elements in each long-term sub-type feature group in S301, and the method for determining the similarities between the long-term embedding sub-vectors in S302, may all be implemented based on an attention network model in an example embodiment. The attention network model may be used for obtaining a distribution difference of similarities of input information by calculating the similarities of the input information, so as to determine information that is more important to a current task.

Then the method for determining a long-term encoding vector corresponding to the long-term feature group according to similarities between elements in the long-term feature group in S202 may include the following operations:

S401: Determine the similarities between the elements in the long-term feature group according to an attention network model.

In this embodiment of the disclosure, each element in the determined long-term feature group may be mapped to a corresponding embedding vector, so that the similarities between the elements in the long-term feature group may be determined by using the attention network model.

S402: Determine the long-term encoding vector corresponding to the long-term feature group according to the similarities between the elements in the long-term feature group.

The methods provided in S401 and S402 are described in detail below.

First, a calculation method of the attention network model is shown in Formula (1):

$$\text{Attention } \mathcal{A}(Q,K,V) = \text{soft max}(QK^T/\sqrt{d_k})V \qquad (1)$$

As shown in Formula (1), Q may represent Query, K may represent Key, and V may represent Value.

The principle of the attention network model may be as follows: First, a dot product ($QK^T$) of Q and each K is calculated to obtain a similarity between Q and each K, and the dot product is scaled by the calculation of $QK^T/\sqrt{d_k}$, where $\sqrt{d_k}$ may be dimensions of vectors Q, K, and V. Then, $QK^T/\sqrt{d_k}$ is normalized to obtain a similarity probability of Q and each K by using a softmax( ) function; and finally, the normalized probabilities are multiplied by the corresponding V and then summed to obtain a first vector corresponding to Q.

Simply put, after the vectors corresponding to Q, K, and V are inputted, the first vector corresponding to Q may be calculated according to Formula (1), and the first vector may reflect similarities between Q and K and between Q and V.

The following introduces the method of the attention network model by using an example of determining similarities between elements in the long-term feature group according to the attention network model.

Since variables inputted into the attention network model are elements in the long-term feature group, that is, same-source data, the attention network model for calculation on the same-source data may be denoted as a self-attention network model. In this embodiment, for each element $X_i$ in the long-term feature group, when similarities of the element $X_i$ with other elements are determined for the element $X_i$, an embedding vector corresponding to the element $X_i$ may be denoted by Q, and embedding vectors corresponding to the remaining elements in the long-term feature group may be denoted by K and V. Then, the first vector corresponding to the element $X_i$ may be determined by using the self-attention network model, that is, Formula (1), and the first vector may include similarities between the element $X_i$ and the remaining elements in the long-term feature group.

In this embodiment of the disclosure, a vector of Q may be determined based on an attention network model of a multi-head scale dot-product. Each head in the multi-head scale dot-product is expressed in Formula (2):

$$head_i = Attention(QW_i^Q, KW_i^K, VW_i^V) \tag{2}$$

where an attention mechanism for any head in the multi-head scale dot-product may be as follows: before Q, K, and V are inputted into the attention network model, i.e., Formula (1), a linear transformation is performed on each Q, K, and V by using $QW_i^Q$, $KW_i^K$, and $VW_i^V$, so that Q, K, V are mapped into a space, and second vectors of Q, K, and V are obtained respectively. $W_i^Q$, $W_i^K$, and $W_i^V$ may be mapping matrices used for linear transformation. The second vectors are then inputted to the attention network model, i.e., Formula (1), to obtain the first vector of Q corresponding to the head.

In this way, Q, K, and V may be mapped into different spaces through different linear transformations, and then first vectors of Q corresponding to different heads may be obtained.

After the first vector of Q corresponding to each head is determined, as shown in Formula (3), the first vectors of Q corresponding to different heads may be concatenated and then multiplied by the corresponding mapping matrix $W_0$, so that a new vector obtained is used as a third vector of Q.

$$H = [head_1, head_2, head_3, \ldots head_n]W_0 \tag{3}$$

In this embodiment of the disclosure, for each element $X_i$ in the long-term feature group, the third vector of each element $X_i$ may be determined by using the same self-attention network model of the multi-head scale dot-product. The third vector of each element $X_i$ in the long-term feature group incorporate information of other elements, and the third vector of each element $X_i$ may be mapped into the same multi-dimensional space.

Next, after the third vector of each element $X_i$ in the long-term feature group is determined, a weight corresponding to each element $X_i$ may be determined based on similarities between each element $X_i$ and other elements, and the manner of determining the weight of each element $X_i$ may be as shown in Formula (4):

$$a_i = soft\ max(v_a \tanh(W_a H^T)) \tag{4}$$

$H^T$ in Formula (4) may be obtained from an output result of Formula (3), $W_a$ may be a mapping matrix, $v_a$ may be a weight mapping vector, and then $v_a \tanh(W_a H^T)$ is normalized by using the softmax( ) function, thereby obtaining the weight of each element $X_i$.

Finally, the weight of each element $X_i$ is assigned to the third vector corresponding to the corresponding element $X_i$, so as to obtain a target vector of each element $X_i$ including weight information, where a corresponding operation method is as shown in Formula (5):

$$c = Ha^T \tag{5}$$

Weighted average pooling is performed on the target vector of each element $X_i$ to obtain the long-term encoding vector corresponding to the long-term feature group.

Correspondingly, the method of the embodiment corresponding to S301-S302 may include the following operations:

S501: Determine the similarities between the elements in each long-term sub-type feature group according to an attention network model.

S502: Determine the long-term embedding sub-vector corresponding to each long-term sub-type feature group according to the similarities between the elements in each long-term sub-type feature group.

In this embodiment of the disclosure, the similarities between the elements in each long-term sub-type feature group may be determined according to the self-attention network model of a multi-head scale dot-product in the foregoing embodiment. Then the long-term embedding sub-vector corresponding to each long-term sub-type feature group is determined according to the similarities between the elements in each long-term sub-type feature group.

The method provided in S501-S502 is described by using an example in which a corresponding long-term embedding sub-vector is determined for a long-term sub-type feature group: the third vector of each element in the feature group may be determined according to Formula (1), Formula (2), and Formula (3), and the third vector of each element may include similarity relationships with other elements. Then, the weight of each element may be obtained according to Formula (4), and the weight of each element may be assigned to the third vector corresponding to each element according to Formula (5) to obtain the target vector of each element. Finally, weighted average pooling is performed on the target vector of each element to obtain the long-term embedding sub-vector corresponding to the long-term sub-type feature group.

In addition, elements with extremely low weights in the long-term sub-type feature group may be used as noisy data of the user, so that the noisy data may be removed when a long-term embedding sub-vector is determined for each long-term sub-type feature group.

S503: Determine similarities between the long-term embedding sub-vectors according to the attention network model.

S504: Determine the long-term encoding vector corresponding to the long-term feature group according to the similarities between the long-term embedding sub-vectors.

In this embodiment of the disclosure, for each long-term sub-type feature group, after the long-term embedding sub-vector corresponding to each long-term sub-type feature group is determined, calculation of a self-attention network model of a multi-head scale dot-product may further be performed on the long-term embedding sub-vector corresponding to each sub-type feature group.

FIG. 5 is a schematic diagram of a method for performing calculation of a self-attention network model of a multi-head scale dot-product for long-term embedding sub-vectors according to an embodiment of the disclosure. As shown in FIG. 5, after the corresponding long-term embedding sub-vector (i.e., the determined long-term embedding sub-vector 1, long-term embedding sub-vector 2, long-term embedding sub-vector 3 . . . , and long-term embedding sub-vector n) is determined for each long-term sub-type feature group, the vectors may be calculated through a self-attention layer of the multi-head scale dot-product to obtain the target vector corresponding to each long-term sub-type feature group (i.e., the long-term embedding sub-vector 1', long-term embedding sub-vector 2', long-term embedding sub-vector 3' . . . , and long-term embedding sub-vector n').

The method of determining the target vector corresponding to each long-term sub-type feature group is described in detail below: the third vector corresponding to each long-term sub-type feature group may be determined according to Formula (1), Formula (2), and Formula (3), and the third vector of each long-term sub-type feature group may include similarity relationships with other long-term sub-type feature groups. Then, the weight of each long-term sub-type feature group may be obtained according to Formula (4), and the weight of each long-term sub-type feature group may be assigned to the third vector corresponding to each long-term sub-type feature group according to Formula (5) to obtain the target vector of each long-term sub-type feature group.

After the target vector corresponding to each long-term sub-type feature group is obtained, the target vector corresponding to each long-term sub-type feature group may be concatenated to obtain a long-dimensional embedding vector, and the long-dimensional embedding vector is passed through a multi-layer feedforward neural network to obtain the long-term encoding vector.

The obtained long-term encoding vector may be in the same dimension as each element in the short-term feature group, making it easier to determine the user embedding vector corresponding to the short-term feature group according to the similarities between the obtained long-term encoding vector and the elements in the short-term feature group in S203.

The determined long-term sub-type feature groups with lower weights are more likely to be noisy data. Therefore, this method may effectively lower the weights of such long-term sub-type feature groups, ensuring that the determined long-term encoding vector is more accurate.

In addition, to fully reflect the short-term browsing interest preferences of the user, in an example embodiment, the elements in the short-term feature group may be classified according to types of the elements in the short-term feature group, so that the short-term feature group includes a plurality of short-term sub-type feature groups, where each short-term sub-type feature group includes elements of a corresponding type. Description is made below with reference to an illustrative example.

FIG. 6 is a schematic diagram of composition of a short-term feature group according to an embodiment of the disclosure. Based on the example in FIG. 3, the elements in the short-term feature group may be classified according to the following three types: document IDs, tags, and categories determined from short-term historical browsing data of a user. Therefore, the short-term sub-type feature groups in the short-term feature group after classification may be as follows: a short-term tag feature group, a short-term category feature group, and a short-term document ID feature group.

The short-term tag feature group may include tag-type elements, for example, Tag 1", Tag 2", and Tag 3". The short-term category feature group may include category-type elements, for example, Category 1", Category 2", and Category 3". The short-term document ID feature group may include elements of document IDs browsed by the user recently, for example, document ID 1, Document ID 2, and Document ID 3.

Then the method for determining a user embedding vector corresponding to the short-term feature group according to similarities between the long-term encoding vector and elements in the short-term feature group in S203 may include the following operations:

S601: Determine short-term embedding sub-vectors corresponding to the plurality of short-term sub-type feature groups according to similarities between the long-term encoding vector and elements in each short-term sub-type feature group.

In this embodiment of the disclosure, the short-term embedding sub-vectors corresponding to the plurality of short-term sub-type feature groups may be determined according to the similarities between the long-term encoding vector determined in S202 and the elements in each short-term sub-type feature group.

S602: Determine the user embedding vector corresponding to the short-term feature group according to similarities between the short-term embedding sub-vectors.

In this embodiment of the disclosure, after the corresponding short-term embedding sub-vector is determined for each short-term sub-type feature group, the user embedding vector corresponding to the short-term feature group may be determined according to the similarities between the short-term embedding sub-vectors.

In some embodiments of the disclosure, after the corresponding short-term embedding sub-vector is determined for each short-term sub-type feature group, for example, the short-term embedding sub-vectors may further be concatenated into a vector, and the concatenated vector is passed through a fully connected network to obtain the user embedding vector.

Thus, the obtained user embedding vector may highlight the browsing interest preferences of the user.

In this embodiment of the disclosure, the method for determining the similarities between the long-term encoding vector and the elements in the long-term feature group in S203, the method for determining the similarities between the long-term encoding vector and the elements in each short-term sub-type feature group in S601, and the method for determining the similarities between the short-term embedding sub-vectors in S602, may all be implemented based on an attention network model in an example embodiment.

Then the method for determining a user embedding vector corresponding to the short-term feature group according to similarities between the long-term encoding vector and elements in the short-term feature group in S203 may include the following operations:

S701: Determine the similarities between the long-term encoding vector and the elements in the short-term feature group according to an attention network model.

S702: Determine the user embedding vector corresponding to the short-term feature group according to the long-term encoding vector and the similarities between the elements in the short-term feature group.

The following describes the method of S701-S702 in detail: the third vector corresponding to the long-term encoding vector may be determined according to Formula (1), Formula (2), and Formula (3), where the third vector of the long-term encoding vector may reflect the similarity between the long-term encoding vector and each element in the short-term feature group. Then, the corresponding weight between the long-term encoding vector and each element in the short-term feature group may be obtained according to Formula (4), and the corresponding weight between the long-term encoding vector and each element in the short-term feature group may be respectively assigned to each element in the short-term feature group according to Formula (5), so as to obtain the target vector of each element. Then the user embedding vector corresponding to the short-term feature group is determined according to the determined target vector of each element in the short-term feature group.

Correspondingly, the method of the embodiment corresponding to S601-S602 may include the following operations:

S801: Determine the similarities between the long-term encoding vector and the elements in each short-term sub-type feature group according to an attention network model.

S802: Determine the short-term embedding sub-vectors corresponding to the plurality of short-term sub-type feature groups according to the similarities between the long-term encoding vector and the elements in each short-term sub-type feature group.

In this embodiment of the disclosure, the similarities between the long-term encoding vector and the elements in each short-term sub-type feature group may be determined according to the attention network model of the multi-head scale dot-product in the foregoing embodiment. The short-term embedding sub-vectors corresponding to the plurality of short-term sub-type feature groups are determined according to the similarities between the long-term encoding vector and the elements in each short-term sub-type feature group.

Figure 7:
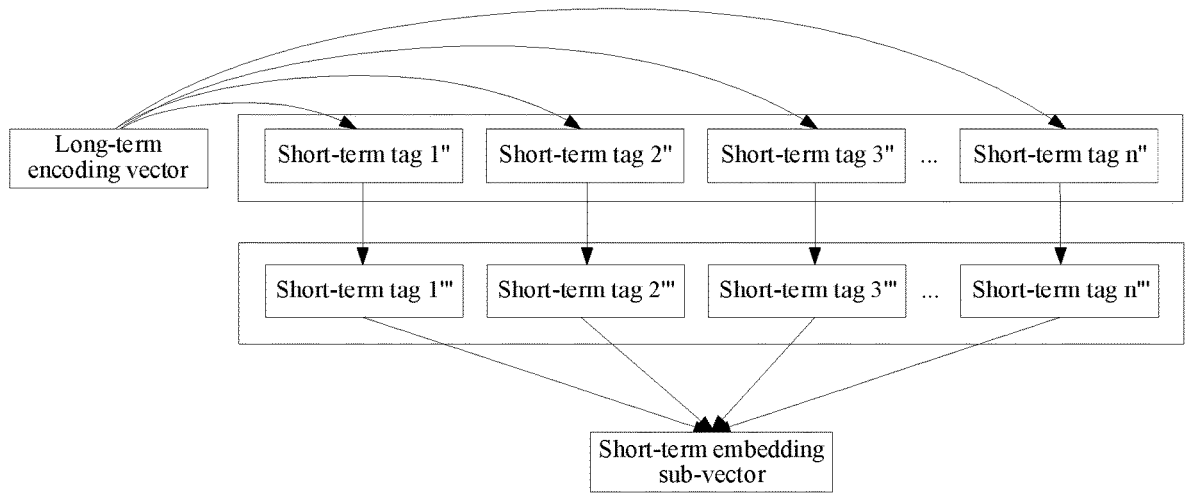
FIG. 7 is a schematic diagram of a process of determining a short-term embedding sub-vector corresponding to a short-term tag feature group according to an embodiment of the disclosure.

The following provides description by using an example of determining a short-term embedding sub-vector corresponding to a short-term tag feature group. FIG. 7 is a schematic diagram of a process of determining a short-term embedding sub-vector corresponding to a short-term tag feature group according to an embodiment of the disclosure. As shown in FIG. 7, it is assumed that the short-term tag feature group, namely, a short-term feature group, includes n short-term tags. Then short-term tags are: a short-term tag 1", a short-term tag 2", a short-term tag 3", . . . , and a short-term tag n". A third vector' corresponding to the long-term encoding vector may be determined according to Formula (1), Formula (2), and Formula (3), where the third vector' of the long-term encoding vector may reflect the similarity between the long-term encoding vector and the vector corresponding to each tag m", where m""=1, 2, 3, . . . . n. Next, a weight between the long-term encoding vector and the vector corresponding to each tag m" may be obtained according to Formula (4), and the weight between the long-term encoding vector and the vector corresponding to each tag m" may be assigned to the vector corresponding to each tag m" according to Formula (5), to obtain a target vector corresponding to each tag m" (that is, the vector corresponding to the tag m"). Furthermore, weighted average pooling is performed on determined target vector corresponding to each tag m" to determine the short-term embedding sub-vector corresponding to the short-term tag feature group.

As can be seen, the elements in each short-term sub-type feature group that have relatively low weights with respect to the long-term encoding vector are more likely to be new browsing interests recently developed by the user. Therefore, although the weights of such elements are lowered by this method, the determined short-term embedding sub-vector corresponding to each short-term sub-type feature group still retains information of such elements.

S803: Determine similarities between the short-term embedding sub-vectors according to the attention network model.

S804: Determine the user embedding vector corresponding to the short-term feature group according to the similarities between the short-term embedding sub-vectors.

In an embodiment of the disclosure, for each short-term sub-type feature group, after the short-term embedding sub-vector corresponding to each short-term sub-type feature group is determined, calculation of a self-attention network model of a multi-head scale dot-product may further be performed on the short-term embedding sub-vector corresponding to each sub-type feature group.

For example, for the three short-term sub-type feature groups: the short-term tag feature group, the short-term category feature group, and the short-term document ID feature group, after corresponding short-term embedding sub-vectors are determined for the three short-term sub-type feature groups respectively, the third vector corresponding to each short-term sub-type feature group may be determined according to Formula (1), Formula (2), and Formula (3), and the third vector of each short-term sub-type feature group may include similarity relationships with other short-term sub-type feature groups. Then, the weight of each short-term sub-type feature group may be obtained according to Formula (4), and the weight of each short-term sub-type feature group may be assigned to the third vector corresponding to each short-term sub-type feature group according to Formula (5) to obtain the target vector of each short-term sub-type feature group.

After the target vector corresponding to each short-term sub-type feature group is obtained, the long-term encoding vector and the target vector corresponding to each short-term sub-type feature group may be concatenated to obtain a long-dimensional embedding vector, and the long-dimensional embedding vector is passed through a multi-layer fully connected network to obtain the user embedding vector.

The determined short-term sub-type feature groups with lower weights are more likely to be noisy data. Therefore, this method may effectively lower the weights of such short-term sub-type feature groups, ensuring that the determined user embedding vector is more accurate.

After the user embedding vector that may highlight the browsing interest preferences of the user is determined, the method for determining, according to the user embedding vector, web content that is used as recommendation candidates in S204 may include the following operations:

S901: Determine similarities between pending web content and the user embedding vector.

In this embodiment of the disclosure, high-quality web content (or having high degree of matching) may be selected in advance as pending web content, and similarities between pending web content and the user embedding vector may be determined. Pending web content that more fits the browsing interest preferences of the user may be selected from the preset pending web content and recommended to the user.

In some embodiments of the disclosure, for example, a cosine similarity between pending web content and the user embedding vector may be calculated to determine a similarity between the pending network content and the user embedding vector. The cosine similarity may be determined by calculating the cosine of an angle between two vectors.

For example, assuming that currently selected pending web content is $X_1, X_2, X_3, \ldots, X_N$, a cosine similarity between a vector corresponding to each pending web content and the user embedding vector may be calculated. The formula for cosine similarity is as follows:

$$\operatorname{Cos}(u, v) = \sum_{i=1}^{n} u_i \times v_i / \left( \sqrt{\sum_{i=1}^{n} u_i^2} \sqrt{\sum_{i=1}^{n} v_i^2} \right) \quad (6)$$

For ease of description, the user embedding vector may be denoted as Eu, and a vector corresponding to any pending web content may be denoted as Ev. Then, $u_i$ and $v_i$ in Formula (6) may be vectors of the same dimensions of Eu and Ev respectively, and n is the number of dimensions of Eu and Ev. In this way, the similarity between each pending web content and the user embedding vector may be determined according to Formula (6), and the determined similarity may represent the similarity between each pending web content and the user embedding vector.

S902: Determine pending web content with similarities meeting a preset condition as the recommendation candidates.

In this embodiment of the disclosure, a preset condition may be set in advance, and the preset condition may be a condition for determining that a pending web content is highly similar to the user embedding vector. Therefore, after the similarities between the pending web content and the user embedding vector are determined, pending web content with a similarity meeting the preset condition may be determined as a recommendation candidate for recommendation to the user.

For example, for 10 pieces of pending web content $X_1$, $X_2$, $X_3$, . . . , and $X_{10}$, if similarities between the pending web content $X_3$, $X_5$, and $X_7$ and the user embedding vector meet the preset condition, the pending web content $X_3$, $X_5$, and $X_7$ may be determined as the recommendation candidates.

The method for processing web content provided in the embodiments of the disclosure is described below in detail with reference to an illustrative application scenario.

For a user U1, a persona feature of the user U1 may be determined according to historical browsing data of the user U1. The persona feature may include a long-term feature group and a short-term feature group, and the long-term feature group and the short-term feature group are determined according to generation time points of elements in the historical browsing data. In some embodiments of the disclosure, the elements in the short-term feature group may be determined based on, for example, several articles recently browsed by the user U1.

Figure 8:
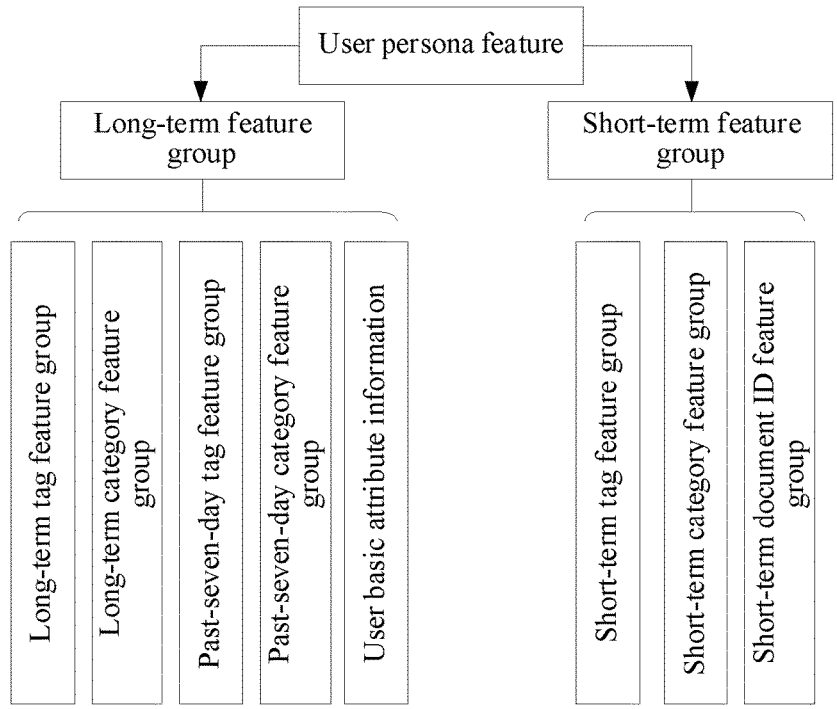
FIG. 8 is a schematic diagram of feature groups included in a persona feature according to an embodiment of the disclosure.

FIG. 8 is a schematic diagram of feature groups included in a persona feature according to an embodiment of the disclosure. The long-term feature group may include: a long-term tag feature group, a long-term category feature group, a past-seven-day tag feature group, a past-seven-day category feature group, and user basic attribute information. The short-term feature group may include: a short-term tag feature group, a short-term category feature group, and a short-term document ID feature group.

FIG. 9 is a schematic diagram of element composition of a persona feature according to an embodiment of the disclosure. FIG. 9 shows elements of long-term sub-type feature groups and short-term sub-type feature groups in the persona feature of the user U1.

Figure 10:
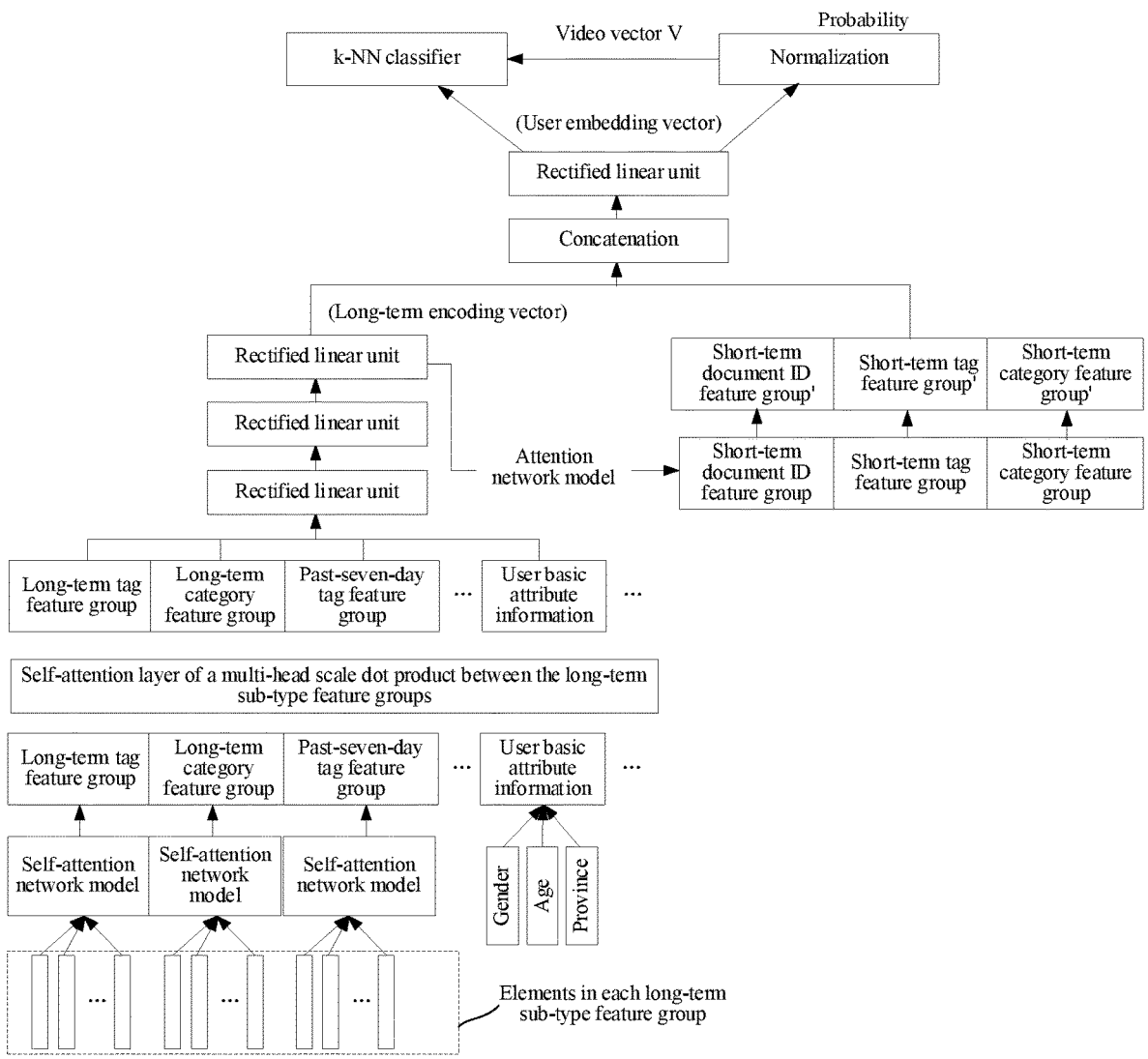
FIG. 10 is a structural diagram of a match framework network corresponding to a method for processing web content according to an embodiment of the disclosure.

After the persona feature of the user U1 is determined, FIG. 10 shows a structural diagram of a match framework network corresponding to a method for processing web content according to an embodiment of the disclosure. As shown in FIG. 10, first, long-term embedding sub-vectors corresponding to the long-term sub-type feature groups may be determined based on the elements in the long-term sub-type feature groups according to the self-attention network model corresponding to Formulas (1) to (5). Then, according to the self-attention layer of the multi-head scale dot-product between the long-term sub-type feature groups, a target vector corresponding to each long-term sub-type feature group is determined. Then the target vectors corresponding to the long-term sub-type feature groups are concatenated to obtain a long-dimensional embedding vector, and finally the long-term encoding vector corresponding to the user U1 is obtained through the multi-layer feedforward neural network. An activation function of each layer of feedforward neural network may be a rectified linear unit (ReLU).

After the long-term encoding vector is determined, based on the attention network model, the short-term embedding sub-vector corresponding to each short-term sub-type feature group may be determined according to the similarities between the long-term encoding vector and the elements in each short-term sub-type feature group. Then the long-term encoding vector is concatenated with each short-term embedding sub-vector to obtain a new vector, and the new vector is passed through a fully connected network, so as to obtain a user embedding vector corresponding to the user U1.

Thus, the user embedding vector corresponding to the user U1 may be inputted into a k-nearest neighbor (k-NN) classifier, thereby implementing the match of candidates. In addition, the user embedding vector may also be normalized, similarities between the normalized user embedding vector and vectors corresponding to other pending web content are calculated, and similarity results are sent to a k-NN server.

Figure 11:
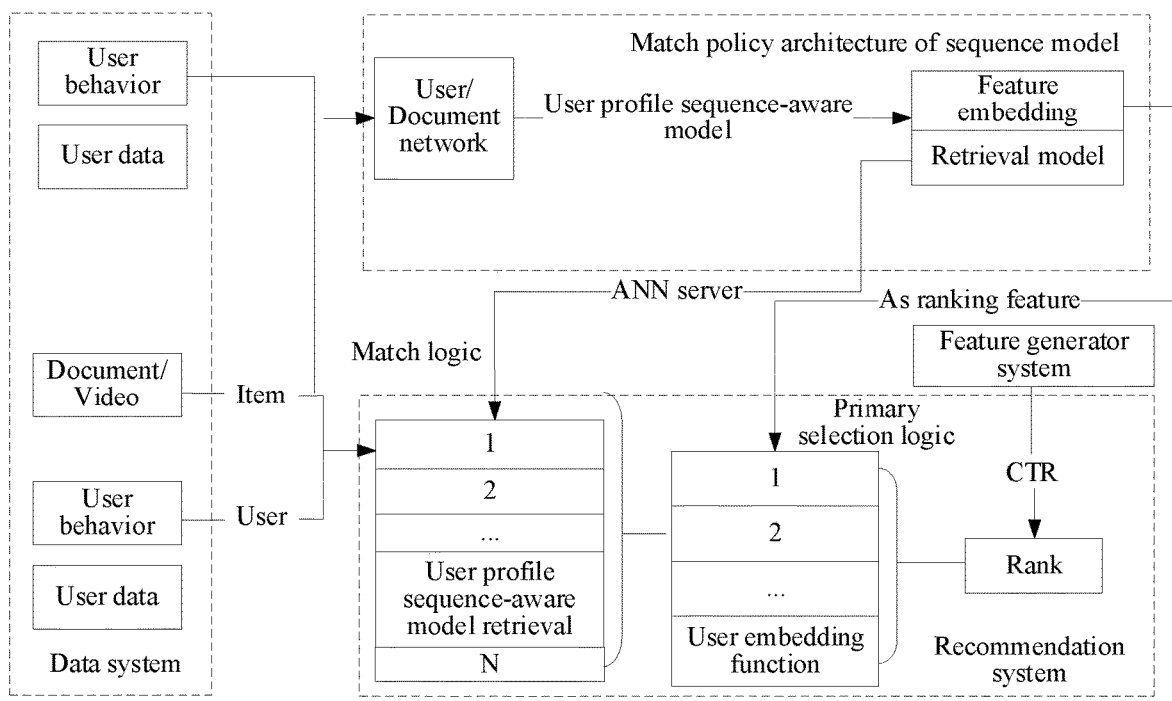
FIG. 11 is a structural diagram of a recommendation system using a match framework network structure according to an embodiment of the disclosure.

In this embodiment of the disclosure, the structural diagram of the match framework network is applicable to some online recommendation systems. For example, FIG. 11 is a structural diagram of a recommendation system using a match framework network structure according to an embodiment of the disclosure. The recommendation system shown in FIG. 11 may include a match logic, a primary selection logic, and a ranking logic.

A sequence match model in the match logic may obtain a recent reading sequence and a persona feature of a user from a data system, and perform encoding by using a trained network. In this way, a user embedding vector is determined, and then candidates that meet a preset condition are determined from pending web content for matching and recommendation.

The primary selection logic may be used for initially filtering a plurality of match results according to specific rules (for example, user document relevance, timeliness, region, and diversity), thereby reducing the amount of calculation for the subsequent ranking logic. In addition, the user embedding vector may also be used as a feature in the primary selection logic to provide more refined semantic features for the primary selection.

The ranking logic may be used for ranking final results according to, for example, a click-through rate (CTR) estimation model, thereby presenting ranked recommendation items to the user. The ranking logic may be used to rank a plurality of web contents, that are determined as matching, according to categories of the plurality of web contents, and adjust an order of displayed web contents according to a result of the ranking of the plurality of web contents.

Figure 12:
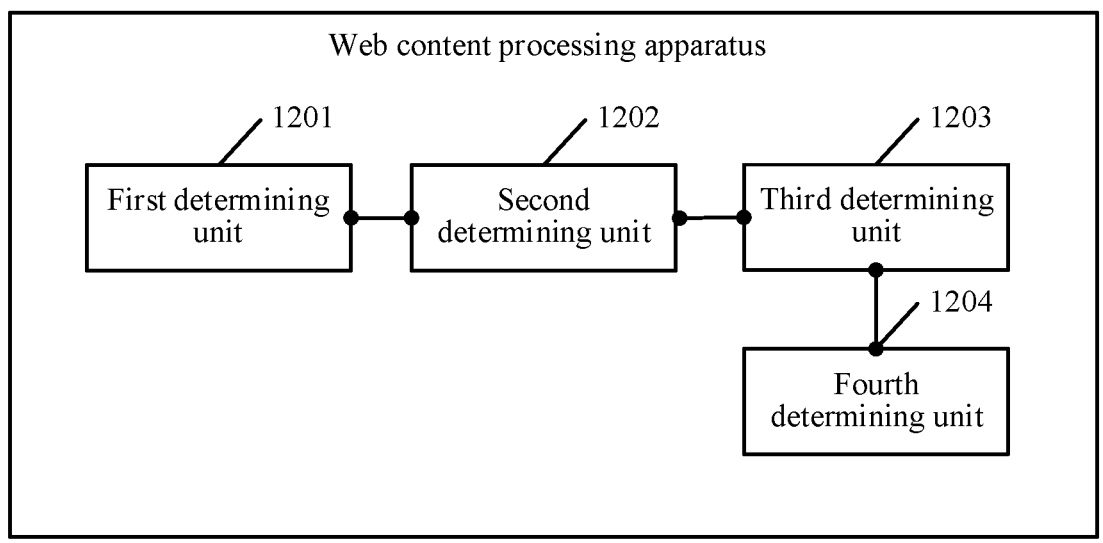
FIG. 12 is a schematic structural diagram of an apparatus for processing web content according to an embodiment of the disclosure.

Based on the method for processing web content according to the foregoing embodiment(s), an embodiment of the disclosure further provides an apparatus for processing web content. FIG. 12 is a schematic structural diagram of an apparatus for processing web content according to an embodiment of the disclosure. The apparatus includes a first determining unit 1201, a second determining unit 1202, a third determining unit 1203, and a fourth determining unit 1204:

the first determining unit 1201 being configured to determine a long-term feature group and a short-term feature group from historical browsing data according to generation time points of elements in the historical browsing data;

the second determining unit 1202 being configured to determine a long-term encoding vector corresponding to the long-term feature group according to similarities between elements in the long-term feature group;

the third determining unit 1203 being configured to determine the user embedding vector corresponding to the short-term feature group according to the long-term encoding vector and the similarities between the elements in the short-term feature group; and the fourth determining unit 1204 being configured to determine, according to the user embedding vector, web content that is used as recommendation candidates.

In some embodiments of the disclosure, the second determining unit 1202 is further configured to:

determine a long-term embedding sub-vector corresponding to each long-term sub-type feature group according to similarities between elements in each long-term sub-type feature group, the long-term feature group comprising a plurality of long-term sub-type feature groups; and determine the long-term encoding vector corresponding to the long-term feature group according to similarities between the long-term embedding sub-vectors.

In some embodiments of the disclosure, the second determining unit 1202 is further configured to:

determine the similarities between the elements in the long-term feature group according to an attention network model; and determine the long-term encoding vector corresponding to the long-term feature group according to the similarities between the elements in the long-term feature group.

In some embodiments of the disclosure, the third determining unit 1203 is further configured to:

determine short-term embedding sub-vectors corresponding to the plurality of short-term sub-type feature groups according to similarities between the long-term encoding vector and elements in each short-term sub-type feature group, the short-term feature group including the plurality of short-term sub-type feature groups; and determine the user embedding vector corresponding to the short-term feature group according to similarities between the short-term embedding sub-vectors.

In some embodiments of the disclosure, the third determining unit 1203 is further configured to:

determine the similarities between the long-term encoding vector and the elements in the short-term feature group according to an attention network model; and determine the user embedding vector corresponding to the short-term feature group according to the long-term encoding vector and the similarities between the elements in the short-term feature group.

In some embodiments of the disclosure, the fourth determining unit 1204 is further configured to:

determine similarities between pending web content and the user embedding vector; and determine pending web content with similarities meeting a preset condition as the recommendation candidates.

In summary, the long-term feature group and the short-term feature group are determined from the historical browsing data according to the generation time points of the elements in the historical browsing data. In other words, the long-term feature group may reflect long-term browsing interests of a user, and the short-term feature group may reflect short-term browsing interests of a user. The long-term encoding vector corresponding to the long-term feature group is determined according to the similarities between the elements in the long-term feature group. Since the long-term encoding vector is obtained according to the similarities between the elements in the long-term feature group, elements with higher similarities in the long-term feature group reflect more information in the long-term encoding vector. Since the user has more browsing behaviors for similar web content that fits browsing interests, and the determined elements with high similarities are similar web content that fits the browsing interests of the user, the long-term encoding vector may better reflect degrees of preference of the user for the browsing interests. The user embedding vector corresponding to the short-term feature group is determined according to the long-term encoding vector and the similarities between the elements in the short-term feature group, so that in the user embedding vector, information that fits the browsing interest preferences of the user may be relatively prominent, and other information is partly retained. The recommendation candidates determined by the user embedding vector are more likely to fit actual browsing interests of the user, and are generalized, which improves the quality of web content recommended for the user and improves the browsing experience.

Figure 13:
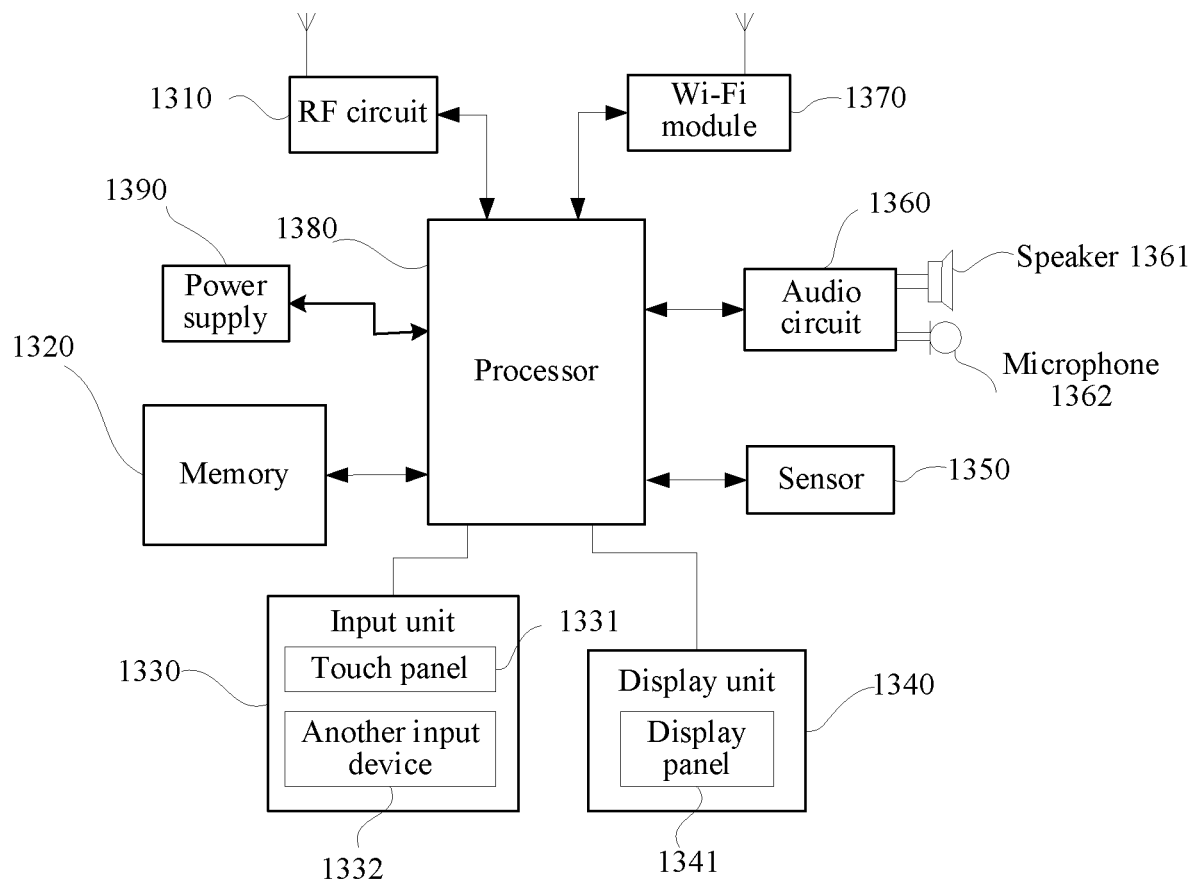
FIG. 13 is a structural diagram of a device for processing web content according to an embodiment of the disclosure.

An embodiment of the disclosure further provides a device for matching web content, and the following describes the device for matching web content with reference to the accompanying drawings. Referring to FIG. 13, an embodiment of the disclosure provides a device for processing web content, and the device may alternatively be a terminal device. The terminal device may be any smart terminal including a mobile phone, a tablet computer, a personal digital assistant (PDA), a point of sales (POS), or an on-board computer, and the terminal device being a mobile phone is used as an example.

FIG. 13 is a block diagram of a partial structure of a mobile phone related to a terminal device according to an embodiment of the disclosure. Referring to FIG. 13, the mobile phone includes components such as a radio frequency (RF) circuit 1310, a memory 1320, an input unit 1330, a display unit 1340, a sensor 1350, an audio circuit 1360, a wireless fidelity (Wi-Fi) module 1370, a processor 1380, and a power supply 1390. A person skilled in the art would understand that the structure of the mobile phone shown in FIG. 13 does not constitute any limitation on the mobile phone, and instead, the mobile phone may include more or fewer components than those shown in the figure, or some components may be combined, or a different component deployment may be used.

The following makes a detailed description of the components of the mobile phone with reference to FIG. 13.

The RF circuit 1310 may be configured to receive and send signals during an information receiving and sending process or a call process. For example, the RF circuit 1310 receives downlink information from a base station, then delivers the downlink information to the processor 1380 for processing, and sends designed uplink data to the base station. The RF circuit 1310 may include, but is not limited to, an antenna, at least one amplifier, a transceiver, a coupler, a low noise amplifier (LNA), a duplexer, and the like. In addition, the RF circuit 1310 may also communicate with a network and another device through wireless communication. The wireless communication may use any communication standard or protocol, including, but not limited to a Global System for Mobile communications (GSM), a general packet radio service (GPRS), code division multiple access (CDMA), wideband code division multiple access (WCDMA), Long Term Evolution (LTE), an email, a short messaging service (SMS), and the like.

The memory 1320 may be configured to store a software program and/or a module. The processor 1380 runs the software program and/or the module that are stored in the memory 1320, to implement various functional applications and data processing of the mobile phone. The memory 1320 may mainly include a program storage area and a data storage area. The program storage area may store an operating system, an application program used by at least one function (for example, a sound playback function and an image display function), and the like. The data storage area may store data (for example, audio data and an address book) created according to the use of the mobile phone, and the like. In addition, the memory 1020 may include a high-speed random access memory, and may also include a nonvolatile memory, for example, at least one magnetic disk storage device, a flash memory, or another volatile solid-state storage device.

The input unit 1330 may be configured to receive input data (e.g., digit or character information), and generate an input signal (e.g., keyboard input signal) related to the user setting and function control of the mobile phone. For example, the input unit 1330 may include a touch panel 1331 and another input device 1332. The touch panel 1331, which may also be referred to as a touchscreen, may collect a touch operation of a user on or near the touch panel (such as an operation of a user on or near the touch panel 1331 by using any suitable object or accessory such as a finger or a stylus), and drive a corresponding connection apparatus according to a preset program. In some embodiments of the disclosure, the touch panel 1331 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 1380. Moreover, the touch controller may receive and execute a command sent from the processor 1380. In addition, the touch panel 1331 may be implemented by using various types, such as a resistive type, a capacitance type, an infrared type, and a surface acoustic wave type. In addition to the touch panel 1331, the input unit 1330 may further include the another input device 1332. For example, the another input device 1332 may include, but is not limited to, one or more of a physical keyboard, a functional key (such as a volume control key or a switch key), a track ball, a mouse, and a joystick.

The display unit 1340 may be configured to display information inputted by the user or information provided for the user, and various menus of the mobile phone. The display unit 1340 may include a display panel 1341. In some embodiments of the disclosure, the display panel 1341 may be configured in the form of a liquid crystal display (LCD), an organic light-emitting diode (OLED), or the like. The touch panel 1331 may cover the display panel 1341. After detecting a touch operation on or near the touch panel 1331, the touch panel transfers the touch operation to the processor 1380, so as to determine a type of the touch event. Then, the processor 1380 provides corresponding visual output on the display panel 1341 according to the type of the touch event. Although in FIG. 13, the touch panel 1331 and the display panel 1341 are used as two separate parts to implement input and output functions of the mobile phone, in some embodiments, the touch panel 1331 and the display panel 1341 may be integrated to implement the input and output functions of the mobile phone.

The mobile phone may further include at least one sensor 1350 such as an optical sensor, a motion sensor, and other sensors. For example, the optical sensor may include an ambient light sensor and a proximity sensor, where the ambient light sensor may adjust luminance of the display panel 1341 according to the luminance of the ambient light, and the proximity sensor may switch off the display panel 1341 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1360, a speaker 1361, and a microphone 1362 may provide audio interfaces between a user and the mobile phone. The audio circuit 1360 may convert received audio data into an electrical signal and transmit the electrical signal to the speaker 1361. The speaker 1361 converts the electrical signal into a sound signal for output. On the other hand, the microphone 1362 converts a collected sound signal into an electrical signal. The audio circuit 1360 receives the electrical signal, converts the electrical signal into audio data, and outputs the audio data to the processor 1380 for processing. Then, the processor 1380 sends the audio data to, for example, another mobile phone by using the RF circuit 1310, or outputs the audio data to the memory 1320 for further processing.

Wi-Fi is a short distance wireless transmission technology. The mobile phone may help, by using the Wi-Fi module 1370, a user to receive and transmit an email, browse a web page, access stream media, and the like. This provides wireless broadband Internet access for the user. Although FIG. 13 shows the Wi-Fi module 1370, it may be understood that the Wi-Fi module is not a necessary component of the mobile phone, and the Wi-Fi module may be omitted provided that the scope of the essence of the present disclosure is not changed.

The processor 1380 is a control center of the mobile phone, and is connected to various parts of the entire mobile phone by using various interfaces and lines. By running or executing a software program and/or module stored in the memory 1320, and invoking data stored in the memory 1320, the processor 1380 executes various functions of the mobile phone and performs data processing, thereby monitoring the entire mobile phone. In some embodiments of the disclosure, the processor 1380 may include one or more processing units. In some embodiments of the disclosure, the processor 1380 may integrate an application processor and a modem processor. The application processor mainly processes an operating system, a user interface, an application program, and the like. The modem processor mainly processes wireless communication. It may be understood that the modulation and demodulation processor may not be integrated into the processor 1380.

The mobile phone further includes the power supply 1390 (such as a battery) for supplying power to the components. In some embodiments of the disclosure, the power supply may be logically connected to the processor 1380 by using a power management system, thereby implementing functions such as charging, discharging, and power consumption management by using the power management system.

Although not shown in the figure, the mobile phone may further include a camera, a Bluetooth module, and the like. Details are not described herein again.

In this embodiment, the processor 1380 included in the terminal device further has the following functions:

determining a long-term feature group and a short-term feature group from historical browsing data according to generation time points of elements in the historical browsing data;

determining a long-term encoding vector corresponding to the long-term feature group according to similarities between elements in the long-term feature group;

determining a user embedding vector corresponding to the short-term feature group according to the long-term encoding vector and similarities between elements in the short-term feature group; and determining, according to the user embedding vector, web content that is used as recommendation candidates.

Figure 14:
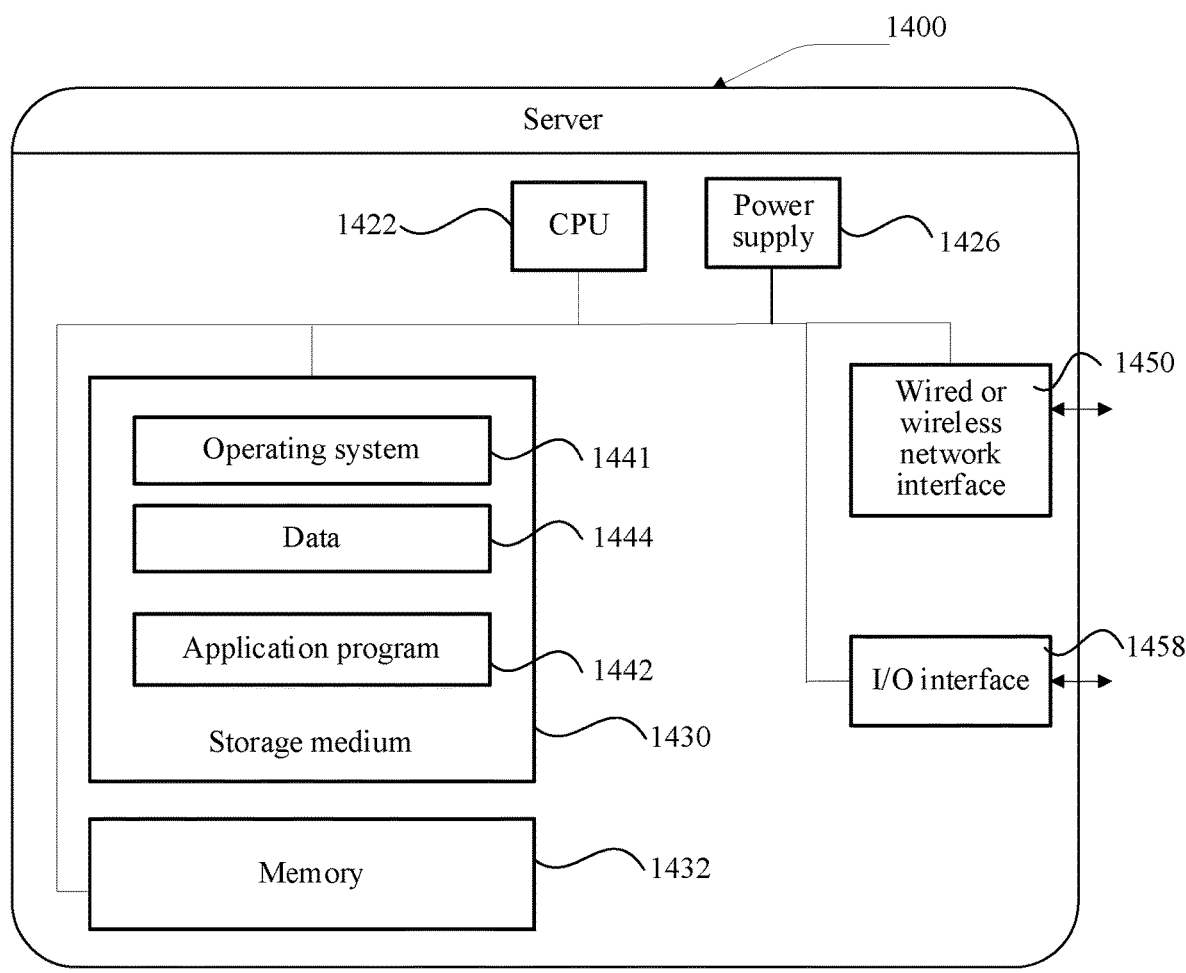
FIG. 14 is a structural diagram of a server according to an embodiment of the disclosure.

The device for matching web content provided in the embodiments of the disclosure may be a server, as shown in FIG. 14. FIG. 14 is a structural diagram of a server 1400 according to an embodiment of the disclosure. The server 1400 may vary greatly due to different configurations or performance, and may include one or more central processing units (CPU) 1422 (for example, one or more processors) and a memory 1432, and one or more storage media 1430 (for example, one or more mass storage devices) that store an application program 1442 or data 1444. The memory 1432 and the storage medium 1430 may implement transient storage or permanent storage. The program stored in the storage medium 1430 may include one or more modules (not shown in the figure), and each module may include a series of instruction operations on the server. the CPU 1422 may be configured to communicate with the storage medium 1430 to perform the series of instruction operations in the storage medium 1430 on the server 1400.

The server 1400 may further include one or more power supplies 1426, one or more wired or wireless network interfaces 1450, one or more input/output interfaces 1458, and/or, one or more operating systems 1441, for example, Windows Server™, Mac OS X™, Unix™, Linux™, and FreeBSD™.

The operations performed by the server in the foregoing embodiments may be based on the server structure shown in FIG. 14.

A long-term feature group and a short-term feature group are determined from historical browsing data according to generation time points of elements in the historical browsing data;

a long-term encoding vector corresponding to the long-term feature group is determined according to similarities between elements in the long-term feature group;

a user embedding vector corresponding to the short-term feature group is determined according to the long-term encoding vector and similarities between elements in the short-term feature group; and web content that is used as recommendation candidates is determined according to the user embedding vector.

The terms such as "first", "second", "third", and "fourth" (if any) in the specification and accompanying drawings of the disclosure are used for distinguishing similar objects and not necessarily used for describing any particular order or sequence. Data used in this way is interchangeable in a suitable case, so that the embodiments of the disclosure described herein may be implemented in a sequence in addition to the sequence shown or described herein. Moreover, the terms "include", "contain", and any other variants thereof mean to cover the non-exclusive inclusion. For example, a process, method, system, product, or device that includes a list of operations or units is not necessarily limited to those operations or units that are clearly listed, but may include other operations or units not expressly listed or inherent to such a process, method, system, product, or device.

In the disclosure, "at least one" means one or more, and "a plurality of" means two or more. The term "and/or" describes an association between associated objects and represents that three associations may exist. For example, "A and/or B" may indicate that only A exists, only B exists, and both A and B exist, wherein A and B may be singular or plural. The character "/" in this specification generally indicates an "or" relationship between the associated objects. "At least one of the following items" or a similar expression means any combination of these items, including a single item or any combination of a plurality of items. For example, at least one of a, b, or c may represent a, b, c, "a and b", "a and c", "b and c", or "a, b, and c", where a, b, and c may be singular or plural.

In the embodiments provided in the disclosure, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the disclosure essentially, or the part contributing to the related art, or all or some of the technical solutions may be implemented in the form of a software product. The computer software product is stored in a storage medium and includes several instructions for instructing a computer device (which may be a personal computer, a server, a network device, or the like) to perform all or some of the operations of the methods described in the embodiments of the disclosure. The foregoing storage medium includes: any medium that may store program code, such as a USB flash disk, a removable hard disk, a read-only memory (ROM), a random access memory (RAM), a magnetic disk, or an optical disc.

The foregoing embodiments are merely intended for describing the technical solutions of the disclosure, but not for limiting the disclosure. Although the disclosure is described in detail with reference to the foregoing embodiments, persons of ordinary skill in the art understand that they may still make modifications to the technical solutions described in the foregoing embodiments or make equivalent replacements to some technical features thereof, without departing from the spirit and scope of the technical solutions of the embodiments of the disclosure.

In the embodiments of the disclosure, a long-term feature group and a short-term feature group are determined from historical browsing data according to generation time points of elements in the historical browsing data; a long-term encoding vector corresponding to the long-term feature group is determined according to similarities between elements in the long-term feature group; a user embedding vector corresponding to the short-term feature group is determined according to the long-term encoding vector and similarities between elements in the short-term feature group; and at least one web content is determined as a recommendation candidate according to the user embedding vector. In the process of matching the web content, since the long-term encoding vector is obtained according to the similarities between the elements in the long-term feature group, elements with higher similarities in the long-term feature group reflect more information in the long-term encoding vector. Since the user has more browsing behaviors for similar web content that fits browsing interests, and the determined elements with high similarities are similar web content that fits the browsing interests of the user, the long-term encoding vector may better reflect degrees of preferences of the user for the browsing interests. In addition, the user embedding vector corresponding to the short-term feature group is determined according to the long-term encoding vector and the similarities between the elements in the short-term feature group, so that in the user embedding vector, information that fits the browsing interest preferences of the user may be relatively prominent. The recommendation candidates determined by the user embedding vector are more likely to fit actual browsing interests of the user, and are more generalized, which improves the quality of web content recommended for the user.

A method and an apparatus for processing web content, a device, and a computer storage medium according to the embodiments of the disclosure have at least the following beneficial technical effects.

1) In the embodiments of the disclosure, a long-term feature group and a short-term feature group are determined from historical browsing data according to generation time points of elements in the historical browsing data. In other words, the long-term feature group may reflect long-term browsing interests of a user, and the short-term feature group may reflect short-term browsing interests of a user. A long-term encoding vector corresponding to the long-term feature group is determined according to similarities between elements in the long-term feature group.

2) Since the long-term encoding vector is obtained according to the similarities between the elements in the long-term feature group, elements with higher similarities in the long-term feature group reflect more information in the long-term encoding vector. Since the user has more browsing behaviors for similar web content that fits browsing interests, and the determined elements with high similarities are similar web content that fits the browsing interests of the user, the long-term encoding vector may better reflect degrees of preference of the user for the browsing interests.

A user embedding vector corresponding to the short-term feature group is determined according to the long-term encoding vector and similarities between elements in the short-term feature group, so that in the user embedding vector, information that fits the browsing interest preferences of the user may be more prominent.

3) Recommendation candidates determined by the user embedding vector are more likely to fit actual browsing interests of the user, are more generalized, and are customized for the user, which improves the quality of web content recommended for the user, and makes it easier for the user to obtain high-quality (or highly matching) content information.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While example embodiments of the disclosure have been particularly shown and described, it will be understood by one of ordinary skill in the art that variations in form and detail may be made therein without departing from the spirit and scope of the attached claims.

What is claimed is:

1. A method for processing web content, performed by a server, the method comprising:
 determining a long-term feature group including first elements that reflect a long-term browsing interest of a user, by using first historical browsing data of the user that are generated in a first predetermined period of a past time, the first elements including items related to a content of the first historical browsing data;
 determining a short-term feature group including second elements that reflect a short-term browsing interest of the user, by using second historical browsing data of the user that are generated in a second predetermined period of the past time, the second predetermined period being shorter than the first predetermined period and relatively recent to a current time, the second elements including items related to a content of the second historical browsing data;

determining a long-term encoding vector that reflects similarities between the first elements in the long-term feature group;

determining a user embedding vector that reflects similarities between the long-term encoding vector and the second elements in the short-term feature group; and determining, as a recommendation candidate, at least one web content based on a similarity between the at least one web content and the user embedding vector, and providing the at least one web content to the user.

2. The method according to claim 1, wherein the long-term feature group comprises a plurality of long-term sub-type feature groups, and the determining the long-term encoding vector comprises:

determining a long-term embedding sub-vector corresponding to each long-term sub-type feature group according to similarities between first elements in each long-term sub-type feature group; and determining the long-term encoding vector corresponding to the long-term feature group according to similarities between long-term embedding sub-vectors.

3. The method according to claim 1, wherein the determining the long-term encoding vector comprises:

determining the similarities between the first elements in the long-term feature group according to an attention network model; and determining the long-term encoding vector corresponding to the long-term feature group according to the similarities between the first elements in the long-term feature group.

4. The method according to claim 1, wherein the short-term feature group comprises a plurality of short-term sub-type feature groups, and the determining the user embedding vector comprises:

determining short-term embedding sub-vectors corresponding to the plurality of short-term sub-type feature groups according to similarities between the long-term encoding vector and second elements in each short-term sub-type feature group; and determining the user embedding vector corresponding to the short-term feature group according to similarities between the short-term embedding sub-vectors.

5. The method according to claim 1, wherein the determining the user embedding vector comprises:

determining similarities between the long-term encoding vector and the second elements in the short-term feature group according to an attention network model; and determining the user embedding vector corresponding to the short-term feature group according to the long-term encoding vector and the similarities between the second elements in the short-term feature group.

6. The method according to claim 1, wherein the determining the at least one web content comprises:

determining a similarity between the at least one web content and the user embedding vector; and determining, as the recommendation candidate, the at least one web content of which a similarity with the user embedding vector meets a preset condition.

7. The method according to claim 6, wherein the at least one web content comprises a plurality of web contents, and the method further comprises:

ranking the plurality of web contents according to categories of the plurality of web contents; and adjusting an order of displayed web contents according to a result of the ranking of the plurality of web contents.

8. An apparatus for processing web content, the apparatus comprising:

at least one memory configured to store program code; and at least one processor configured to read the program code and operate as instructed by the program code, the program code comprising:

long-term feature group determining code configured to cause at least one of the at least one processor to determine a long-term feature group including first elements that reflect a long-term browsing interest of a user, by using first historical browsing data of the user that are generated in a first predetermined period of a past time, the first elements including items related to a content of the first historical browsing data;

short-term feature group determining code configured to cause at least one of the at least one processor to determine a short-term feature group including second elements that reflect a short-term browsing interest of the user, by using second historical browsing data of the user that are generated in a second predetermined period of the past time, the second predetermined period being shorter than the first predetermined period and relatively recent to a current time, the second elements including items related to a content of the second historical browsing data;

long-term encoding vector determining code configured to cause at least one of the at least one processor to determine a long-term encoding vector that reflects similarities between first elements in the long-term feature group;

user embedding vector determining code configured to cause at least one of the at least one processor to determine a user embedding vector that reflects similarities between the long-term encoding vector and the second elements in the short-term feature group; and recommendation candidate determining code configured to cause at least one of the at least one processor to determine, as a recommendation candidate, at least one web content based on a similarity between the at least one web content and the user embedding vector, and provide the at least one web content to the user.

9. The apparatus according to claim 8, wherein the long-term feature group comprises a plurality of long-term sub-type feature groups, and the long-term encoding vector determining code is further configured to cause at least one of the at least one processor to determine a long-term embedding sub-vector corresponding to each long-term sub-type feature group according to similarities between first elements in each long-term sub-type feature group; and determine the long-term encoding vector corresponding to the long-term feature group according to similarities between long-term embedding sub-vectors.

10. The apparatus according to claim 8, wherein the long-term encoding vector determining code is further configured to cause at least one of the at least one processor to determine the similarities between the first elements in the long-term feature group according to an attention network model; and determine the long-term encoding vector corresponding to the long-term feature group according to the similarities between the first elements in the long-term feature group.

11. The apparatus according to claim 8, wherein the short-term feature group comprises a plurality of short-term sub-type feature groups, and the user embedding vector determining code is further configured to cause at least one of the at least one processor to determine short-term embedding sub-vectors corresponding to the plurality of short-term sub-type feature groups according to similarities between the long-term encoding vector and second elements in each short-term sub-type feature group; and determine the user embedding vector corresponding to the short-term feature group according to similarities between the short-term embedding sub-vectors.

12. The apparatus according to claim 8, wherein the user embedding vector determining code is further configured to cause at least one of the at least one processor to determine similarities between the long-term encoding vector and the second elements in the short-term feature group according to an attention network model; and determine the user embedding vector corresponding to the short-term feature group according to the long-term encoding vector and the similarities between the second elements in the short-term feature group.

13. The apparatus according to claim 8, wherein the recommendation candidate determining code configured to cause at least one of the at least one processor to determine a similarity between the at least one web content and the user embedding vector; and determine, as the recommendation candidate, the at least one web content of which a similarity with the user embedding vector meets a preset condition.

14. The apparatus according to claim 13, wherein the at least one web content comprises a plurality of web contents, and the program code further comprises:

ranking code configured to cause at least one of the at least one processor to rank the plurality of web contents according to categories of the plurality of web contents; and adjusting code configured to cause at least one of the at least one processor to adjust an order of displayed web contents according to a result of the ranking of the plurality of web contents.

15. A server, comprising a processor and a memory, the memory being configured to store a computer program; and the processor being configured to perform, when running the computer program, the method for processing web content according to claim 1.

16. A non-transitory computer-readable storage medium, configured to store a computer program, the computer program being executable by at least one processor to perform:

determining a long-term feature group including first elements that reflect a long-term browsing interest of a user, by using first historical browsing data of the user that are generated in a first predetermined period of a past time, the first elements including items related to a content of the first historical browsing data;

determining a short-term feature group including second elements that reflect a short-term browsing interest of the user, by using second historical browsing data of the user that are generated in a second predetermined period of the past time, the second predetermined period being shorter than the first predetermined period and relatively recent to a current time, the second elements including items related to a content of the second historical browsing data;

determining a long-term encoding vector that reflects similarities between the first elements in the long-term feature group;

determining a user embedding vector that reflects similarities between the long-term encoding vector and the second elements in the short-term feature group; and determining, as a recommendation candidate, at least one web content based on a similarity between the at least one web content and the user embedding vector, and providing the at least one web content to the user.

\* \* \* \* \*